(12) United States Patent
Dannoux et al.

(10) Patent No.: US 9,556,054 B2
(45) Date of Patent: Jan. 31, 2017

(54) CORRUGATED SHEET, METHOD OF MANUFACTURE THEREOF, AND MOLD THEREFOR

(71) Applicant: Corning Incorporated, Corning, NY (US)

(72) Inventors: Thierry Luc Alain Dannoux, Avon (FR); Ronan Tanguy, Grez sur Loing (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/000,737

(22) Filed: Jan. 19, 2016

(65) Prior Publication Data

US 2016/0130169 A1 May 12, 2016

Related U.S. Application Data

(63) Continuation of application No. PCT/US2014/047933, filed on Jul. 24, 2014.

(60) Provisional application No. 61/858,892, filed on Jul. 26, 2013.

(51) Int. Cl.
| | | |
|---|---|---|
| *C03B 23/023* | (2006.01) | |
| *C03B 23/02* | (2006.01) | |
| *B29C 53/22* | (2006.01) | |
| *C03B 40/02* | (2006.01) | |
| *B21D 13/02* | (2006.01) | |

(52) U.S. Cl.
CPC ............. *C03B 23/023* (2013.01); *B29C 53/22* (2013.01); *C03B 23/02* (2013.01); *C03B 40/02* (2013.01); *B21D 13/02* (2013.01)

(58) Field of Classification Search
CPC .................. Y10T 428/24479; Y10T 428/2457; C03B 13/08; C03B 13/12; C03B 23/245; C03B 23/004; C03B 23/02; C03B 23/023; C03B 13/06
USPC ................................................. 428/156, 167
See application file for complete search history.

(56) References Cited

U.S. PATENT DOCUMENTS

| | | | |
|---|---|---|---|
| 689,047 A | 12/1901 | Hartung | |
| 1,336,056 A | 4/1920 | Spinasse | |
| 1,347,202 A | 7/1920 | Bisbing | |
| 1,507,055 A | 9/1924 | Forger | |
| 1,535,061 A | 4/1925 | Troutman et al. | |

(Continued)

FOREIGN PATENT DOCUMENTS

| | | |
|---|---|---|
| CN | 1213954 C | 8/2005 |
| CN | 1227172 C | 11/2005 |

(Continued)

OTHER PUBLICATIONS

Hausöl et al.; "Corrugated glass-ceramics from LZSA cast tapes", Journal of Materials Processing Technology 210 (2010); pp. 1556-1561.

(Continued)

*Primary Examiner* — Catherine A Simone
(74) *Attorney, Agent, or Firm* — Russell S. Magaziner

(57) ABSTRACT

A glass or glass-ceramic sheet includes peaks and valleys, where a cross-sectional profile in one direction along the sheet contains a first plurality of peaks, and a cross-sectional profile along the sheet in a perpendicular direction to that direction contains a second plurality of peaks. The first plurality is different from the second plurality of peaks.

13 Claims, 10 Drawing Sheets

(56) References Cited

U.S. PATENT DOCUMENTS

| | | |
|---|---|---|
| 1,557,504 A | 10/1925 | Vollmar |
| 1,565,307 A | 12/1925 | Blair |
| 1,566,181 A | 12/1925 | Brasseur et al. |
| 1,609,998 A | 12/1926 | Ferngren |
| 1,610,004 A | 12/1926 | Grolemund |
| 1,628,353 A | 5/1927 | Boudin |
| 1,640,076 A | 8/1927 | Hart |
| 1,670,246 A | 5/1928 | Ferngren |
| 1,692,569 A | 11/1928 | Reece |
| 1,695,547 A | 12/1928 | Grolemund |
| 2,131,404 A | 9/1938 | Long |
| 2,417,094 A | 3/1947 | Spinasse |
| 2,610,444 A | 9/1952 | Kurz |
| 2,624,979 A | 1/1953 | Clever et al. |
| 2,680,936 A | 6/1954 | Grotefeld |
| 2,697,311 A | 12/1954 | Polan |
| 2,746,209 A | 5/1956 | Walters |
| 2,925,688 A | 2/1960 | Carson |
| 2,968,892 A | 1/1961 | Pilkington |
| 2,968,893 A | 1/1961 | Pilkington |
| 3,223,498 A | 12/1965 | Davidson, Jr. |
| 3,290,133 A | 12/1966 | Thomas |
| 3,294,516 A | 12/1966 | Carson et al. |
| 3,317,302 A | 5/1967 | Misson |
| 3,362,806 A | 1/1968 | Brewin et al. |
| 3,388,522 A | 6/1968 | Lowes |
| 3,430,479 A | 3/1969 | Bell et al. |
| 3,484,327 A | 12/1969 | Denman |
| 3,514,275 A | 5/1970 | Bray |
| 3,711,265 A | 1/1973 | Jadin |
| 3,762,902 A | 10/1973 | Wagner et al. |
| 3,775,080 A | 11/1973 | Brichard |
| 3,806,329 A | 4/1974 | Brichard |
| 3,844,757 A | 10/1974 | Kaufman et al. |
| 3,854,920 A | 12/1974 | Kay et al. |
| 3,865,680 A | 2/1975 | Reese et al. |
| 3,905,790 A | 9/1975 | Strickland |
| 3,955,019 A | 5/1976 | Keith |
| 3,992,181 A | 11/1976 | Frank |
| 4,138,239 A | 2/1979 | Nier et al. |
| 4,197,108 A | 4/1980 | Frank et al. |
| 4,205,975 A | 6/1980 | Graf |
| 4,466,700 A | 8/1984 | Christiansen et al. |
| 4,518,411 A | 5/1985 | Frank et al. |
| 4,723,983 A | 2/1988 | Erdmann et al. |
| 4,830,652 A | 5/1989 | Guenthner |
| 4,853,018 A | 8/1989 | Koss et al. |
| 4,865,639 A | 9/1989 | Kudo |
| 4,897,102 A | 1/1990 | Modesitt et al. |
| 5,066,320 A | 11/1991 | Lehto et al. |
| 5,118,335 A | 6/1992 | Claassen et al. |
| 5,176,733 A | 1/1993 | Koss |
| 5,234,741 A | 8/1993 | Kaffrell |
| 5,271,755 A | 12/1993 | Dietl |
| 5,525,137 A | 6/1996 | DiCarlo |
| 6,240,746 B1 | 6/2001 | Maeda et al. |
| 6,748,765 B2 | 6/2004 | Pitbladdo |
| 6,782,719 B2 | 8/2004 | Fenton |
| 6,810,693 B1 | 11/2004 | Hartman et al. |
| 7,373,792 B2 | 5/2008 | Menzel et al. |
| 7,411,351 B2 | 8/2008 | Iida et al. |
| 7,716,949 B2 | 5/2010 | Bennett et al. |
| 8,549,753 B2 | 10/2013 | Neubauer |
| 8,661,851 B2 | 3/2014 | Kuhn et al. |
| 8,881,551 B2 | 11/2014 | Nitschke et al. |
| 2006/0012895 A1 | 1/2006 | Desmitt et al. |
| 2008/0115534 A1 | 5/2008 | Kernan |
| 2010/0051093 A1 | 3/2010 | Harder et al. |
| 2010/0154862 A1* | 6/2010 | Schiavoni ............... C03B 13/08 136/246 |
| 2011/0250423 A1 | 10/2011 | Fukasawa et al. |
| 2013/0068737 A1 | 3/2013 | Saito |

FOREIGN PATENT DOCUMENTS

| | | |
|---|---|---|
| CN | 101277799 A | 10/2008 |
| CN | 101520547 A | 9/2009 |
| CN | 100546928 C | 10/2009 |
| CN | 101555092 A | 10/2009 |
| CN | 101555093 A | 10/2009 |
| CN | 101440628 B | 8/2010 |
| CN | 201589925 U | 9/2010 |
| CN | 102040329 A | 5/2011 |
| CN | 101823841 B | 1/2012 |
| CN | 102336512 A | 2/2012 |
| CN | 101200344 B | 4/2012 |
| CN | 102442761 A | 5/2012 |
| CN | 102024579 B | 8/2012 |
| CN | 102730950 A | 10/2012 |
| CN | 102765872 A | 11/2012 |
| CN | 102789012 A | 11/2012 |
| CN | 202785983 U | 3/2013 |
| EP | 0022884 A1 | 1/1981 |
| EP | 132701 B1 | 10/1988 |
| EP | 373265 B1 | 1/1994 |
| GB | 473165 A | 10/1937 |
| GB | 563658 A | 8/1944 |
| GB | 884330 A | 12/1961 |
| GB | 1000698 A | 8/1965 |
| GB | 1028652 A | 5/1966 |
| GB | 1057994 A | 2/1967 |
| GB | 1062409 A | 3/1967 |
| GB | 2392669 A | 3/2004 |
| JP | S5879846 A | 5/1983 |
| JP | 64014122 A | 1/1989 |
| JP | 4119673 A | 4/1992 |
| JP | 5038900 A | 2/1993 |
| JP | 10059733 A | 3/1998 |
| JP | 11240737 A | 9/1999 |
| JP | 2000016825 A | 1/2000 |
| JP | 03159965 B2 | 4/2001 |
| JP | 2003110128 A | 4/2003 |
| JP | 2004137109 A | 5/2004 |
| JP | 2004284843 A | 10/2004 |
| JP | 2005067997 A | 3/2005 |
| JP | 2005206387 A | 8/2005 |
| JP | 2005330166 A | 12/2005 |
| JP | 2006005021 A | 1/2006 |
| JP | 2006248855 A | 9/2006 |
| JP | 2007015908 A | 1/2007 |
| JP | 2007217969 A | 8/2007 |
| JP | 2008100879 A | 5/2008 |
| JP | 2011135123 A | 7/2011 |
| JP | 04743665 B2 | 8/2011 |
| JP | 2011168476 A | 9/2011 |
| JP | 2012076974 A | 4/2012 |
| KR | 2005039295 A | 4/2005 |
| WO | 0230838 A1 | 4/2002 |
| WO | 2006059402 A1 | 6/2006 |
| WO | 2012118612 A1 | 9/2012 |

OTHER PUBLICATIONS

European Patent Office; International Search Report; Mail Date: Oct. 22, 2014; pp. 1-3.

* cited by examiner

CORRUGATED SHEET, METHOD OF MANUFACTURE THEREOF, AND MOLD THEREFOR

This application is a continuation of International Patent Application Serial No. PCT/US14/47933, filed on Jul. 24, 2014, which claims the benefit of priority under 35 U.S.C. §119 of U.S. Provisional Application Ser. No. 61/858,892, filed on Jul. 26, 2013, the contents of which are relied upon and incorporated herein by reference in their entireties.

FIELD

The present specification generally relates to making corrugated sheets, and more specifically, large amplitude 3D corrugated thin sheets, such as those comprised of glass, glass ceramic, or polymer.

TECHNICAL BACKGROUND

Various methods of manufacturing corrugated glass articles are known. In some known examples, the corrugation peak is quite small or close to a fraction of the sheet thickness.

SUMMARY

Disclosed herein are methods of making corrugated sheets, and more specifically, large amplitude 3D corrugated thin sheets, such as those comprised of glass, glass ceramic, or polymer. Also disclosed herein are molds utilized in such methods, as well as corrugated sheets manufactured therefrom.

Generally, a large amplitude 3D corrugated sheet, that is, a sheet having a corrugation surface, can be produced by providing a preform sheet and placing the preform sheet between two opposed reforming structures, comprising molds, which provide local pushing means for contacting the preform sheet in select localized locations, heating the preform sheet, moving at least one of the reforming structures toward the opposing reforming structure and the preform sheet sandwiched between the two opposing reforming structures. In some embodiments, sheet deformations can thus be imposed on dedicated limited areas or locations of the preform sheet. The preform sheet can then be cooled. The combined pressing action of the various local pushing means actions allow the creation of the desired 3D sheet, or the desired sheet having a 3D corrugated surface. Surface degradation of the sheet can thus be minimized because the local pushing means can present minimum surface interaction involving small areas of contact, such as provided by balls or other rounded local pushers.

Additional features and advantages of the corrugated sheets and method and apparatus of making will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 10 shows ball protrusion on one face of the mold metal sheet frame.

DETAILED DESCRIPTION

Figure 1:
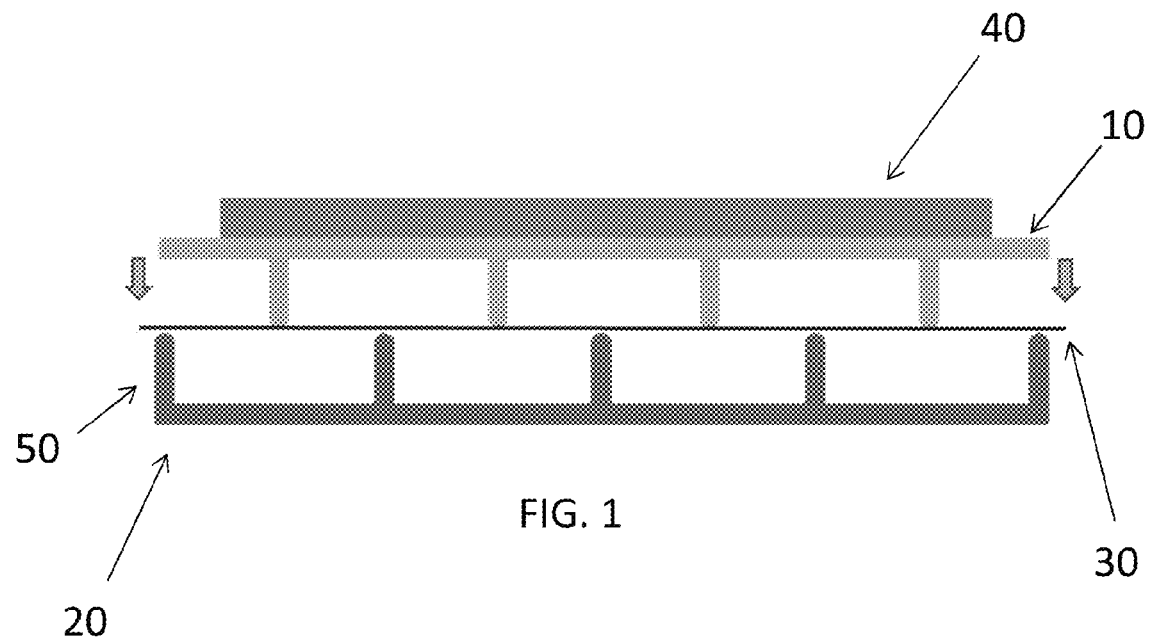
FIGS. 1 and 2 schematically illustrate pushing members of a first reforming structure being spatially offset from pushing members of a second reforming structure.
Figure 2:
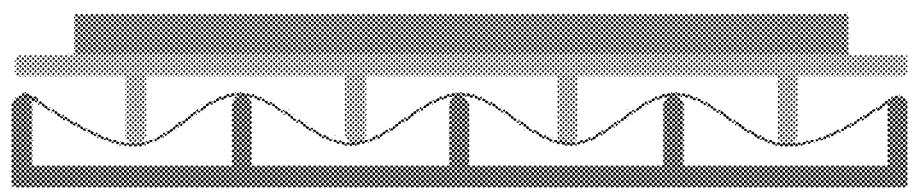

FIGS. 1 and 2 schematically illustrate (in 2-D cross-section) the formation of corrugated sheets as disclosed herein.

FIG. 1 schematically illustrates first and second reforming structures 10, 20 in opposing arrangement, shown in horizontal orientation, with a preform sheet 30 sandwiched, or disposed, therebetween. Alternatively, first and second reforming structures 10, 20 in opposing arrangement could be implemented in a vertical orientation, or at an angle between horizontal and vertical. FIG. 1 shows a mass or weight or pressing member 40 for actuating the first reforming structure toward the second reforming structure, the movement being as indicated, for example, by the pair of solid arrows in FIG. 1. Such pressing member could be, for example, a hydraulic or mechanical actuating mechanism. Alternatively, or in addition, a pressing member for actuating the second first reforming structure toward the first reforming structure could be implemented. Each of the reforming structures are depicted as comprising pushing means, such as each reforming structure having a plurality of pushing members 50.

FIG. 2 schematically illustrates the first and second reforming structures of FIG. 1 in a compressed mode wherein the preform sheet has been formed to have corrugations characterized by peaks and valleys, or ridges and grooves, or both. Alternatively, first and second reforming structures in opposing arrangement could be implemented in a vertical orientation, or at an angle between horizontal and vertical. FIG. 1 shows a weight or pressing member for actuating the first reforming structure toward the second reforming structure. Alternatively, or in addition, a pressing member for actuating the second first reforming structure toward the first reforming structure could be implemented.

FIGS. 1 and 2 schematically illustrate the pushing members of the first reforming structure being spatially offset from the pushing members of the second reforming structure.

Figure 3:
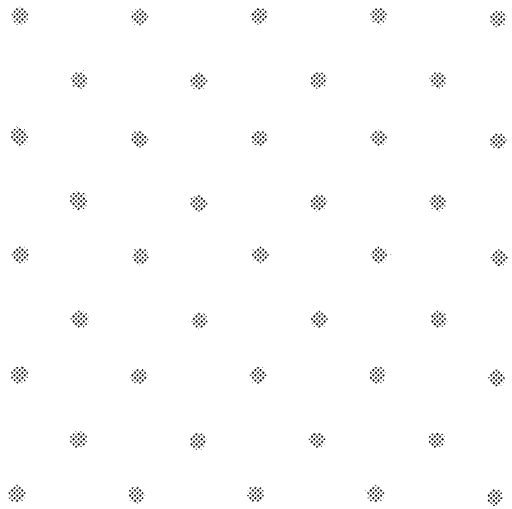
FIG. 3 schematically illustrates in 2-D an embodiment of a first reforming structure having a plurality of pushing member.
Figure 4:
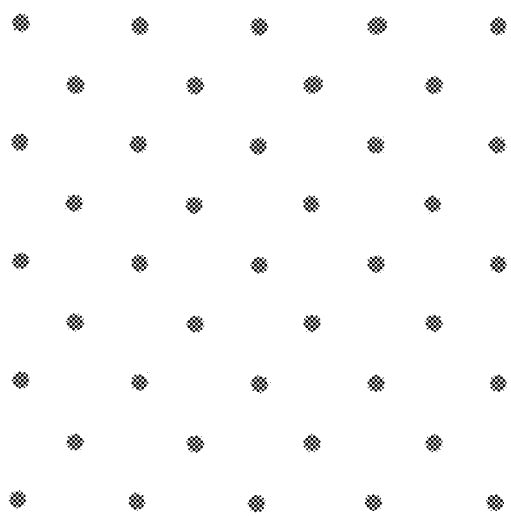
FIG. 4 schematically illustrates in 2-D an embodiment of a second reforming structure having a plurality of pushing members.

FIG. 3 schematically illustrates in 2-D an embodiment of a first reforming structure having a plurality of pushing members, and FIG. 4 schematically illustrates in 2-D an embodiment of a second reforming structure having a plurality of pushing members. In these embodiments, each reforming structure, or mold, is presented with a squared-centered pattern (square plus a central dot). Other patterns or combinations of patterns are contemplated herein.

Figure 5:
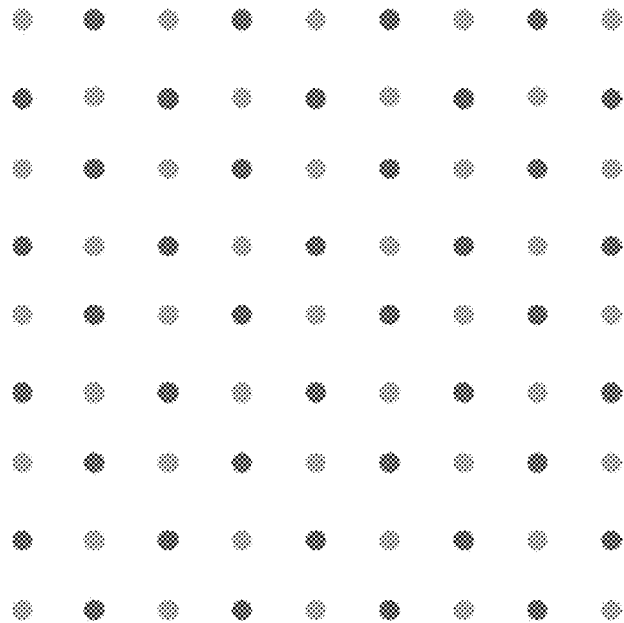
FIG. 5 schematically illustrates in 2-D the superposition of the reforming structures, or molds, of FIGS. 3 and 4, for example in position for pressing and reforming of the preform sheet.

FIG. 5 schematically illustrates in 2-D the superposition of the reforming structures, or molds, of FIGS. 3 and 4, for example in position for pressing and reforming of the preform sheet.

Figure 6:
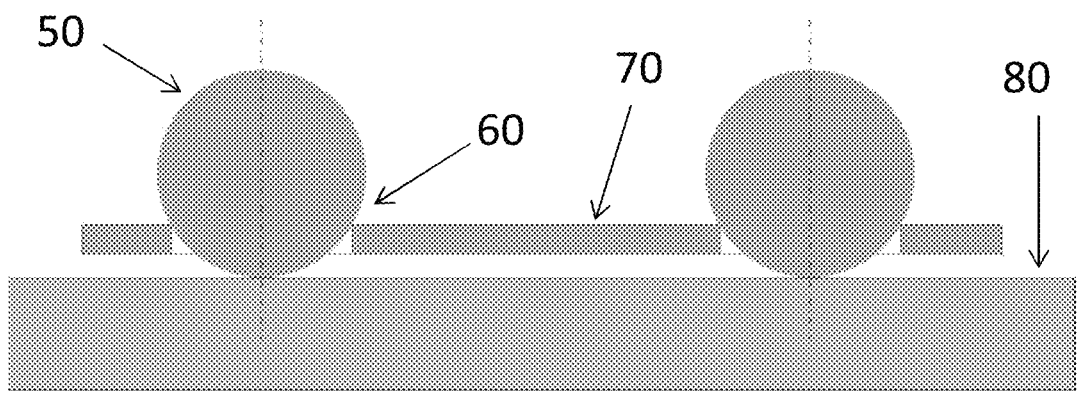
FIG. 6 schematically illustrates in 2-D one set of embodiments wherein one or more reforming structure is a mold which can comprise a support sheet provided with locating holes for local pushing means or local pushing members.

FIG. 6 schematically illustrates in 2-D one set of embodiments wherein one or more reforming structure is a mold which can comprise a support sheet provided with locating holes for local pushing means or local pushing members. Such locating holes can provide a high geometrical accuracy, light weight, low cost, or a combination of these. Local pushing members can be made of machined metal pieces, and advantageously in some embodiments can be made of stainless steel or refractory material, such as stainless steel balls or refractory balls used as ball bearings; such pushing members can provide very accurate sphericity and diametral control, and can additionally provide excellent surface roughness. FIG. 6 schematically shows an embodiment wherein each metal or refractory balls sits in a hole 60 made in a support sheet 70 such as a thin metal sheet in order to protrude on one side while the ball is supported on the other side by a master frame 80 made of a relatively non-deformable material, such as glass-ceramic. The metal balls can be welded to the metal sheet. Advantageously, balls sit in holes made in the thin metal sheet in order to protrude on the other side, that is, a portion of a ball can sit within a hole in the metal sheet, while another portion of the ball, opposite the portion sitting in the hole, can protrude out of the metal sheet. In the case where FIG. 6 represents, for example, a horizontal orientation, the reference in elevation can then be directly controlled by the diameter of ball, that can be, for example, better than +/−10 µm. The ball can be directly in contact with a top and bottom glass ceramic master.

Figure 7:
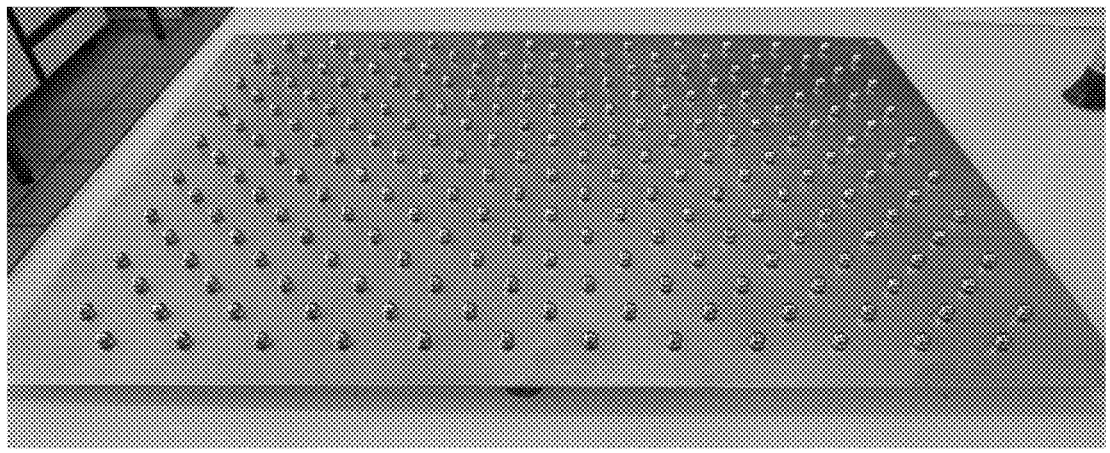
FIG. 7 shows a picture of an embodiment of a mold comprising 10 mm diameter balls which pass through a holed metal sheet and which are welded onto the sheet.

FIG. 7 shows a picture of an embodiment of a mold comprising 10 mm diameter balls which pass through a holed metal sheet and which are welded onto the sheet. Other embodiments disclosed herein are also similarly not limited, even if depicted in other drawings herein with solid lines.

Figure 8:
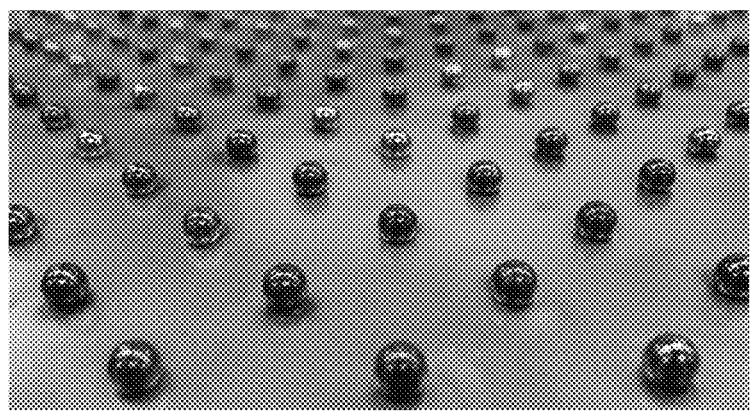
FIG. 8 shows a picture of an embodiment of a mold disclosed herein.

FIG. 8 shows a picture of an embodiment of a mold comprising 10 mm diameter stainless steel balls arranged in a periodic squared centered pattern presenting a 52 mm pitch.

Figure 9:
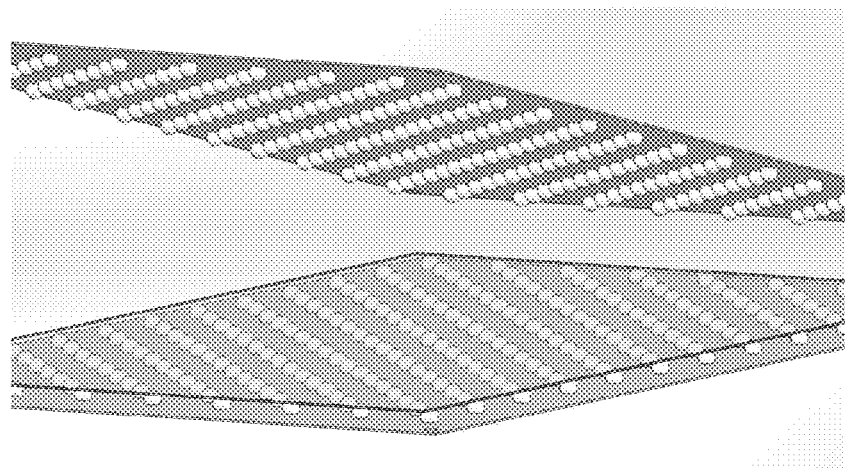
FIGS. 9 and 10 schematically illustrate in 3-D first and second reforming structures in opposing arrangement with a preform sheet disposed therebetween.
Figure 10:
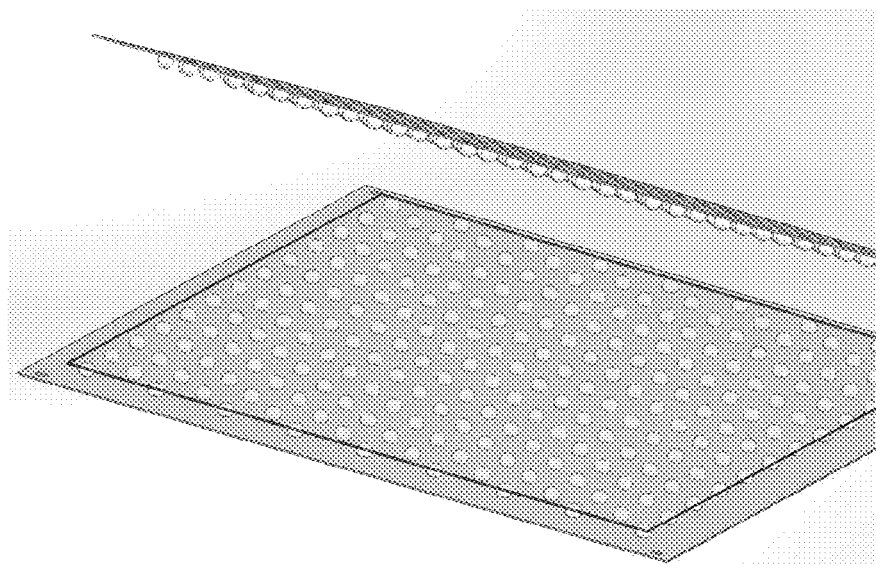

FIGS. 9 and 10 schematically illustrate in 3-D first and second reforming structures in opposing arrangement with a preform sheet disposed therebetween.

FIG. 10 shows ball protrusion on one face of the mold metal sheet frame. In one set of embodiments, balls are located on, or sit on, 8 mm diameter holes which were laser cut on a 1 mm thick stainless steel metal sheet, and the balls intentionally protrude out one side of the metal sheet in order to precisely contact a reference master, and the reference master is comprised of a 4 mm thick glass ceramic plate which is relatively undeformable during the reforming thermal cycle. The balls can be welded to the metal sheet by two tungsten inert gas points or argon laser welding techniques.

Figure 11:
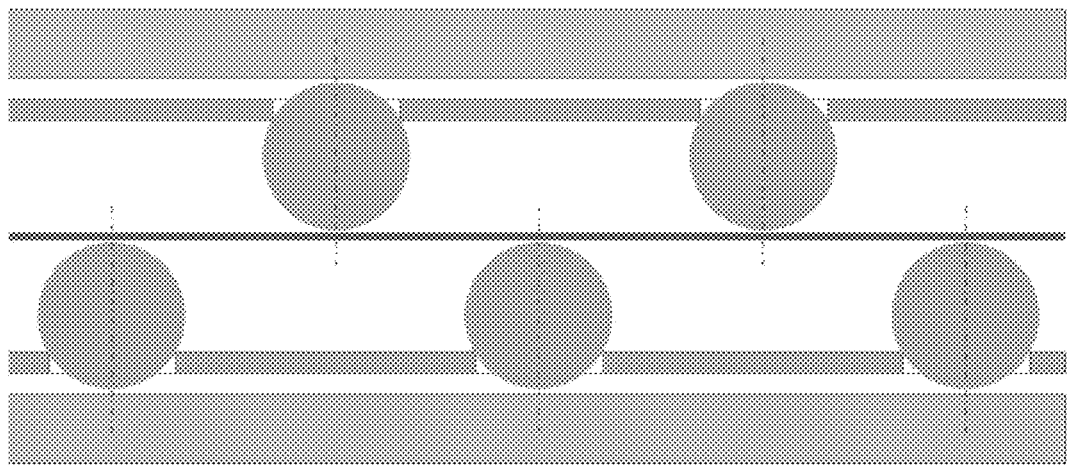
FIG. 11 schematically illustrates in 2-D first and second reforming structures, i.e. first and second molds, in opposing arrangement, shown in horizontal orientation, with a preform sheet sandwiched, or disposed, therebetween, before reforming.

FIG. 11 schematically illustrates in 2-D first and second reforming structures, i.e. first and second molds, in opposing arrangement, shown in horizontal orientation, with a preform sheet sandwiched, or disposed, therebetween. Each of the reforming structures are depicted as comprising pushing means, e.g. each reforming structure has a plurality of pushing members, here, balls.

Figure 12:
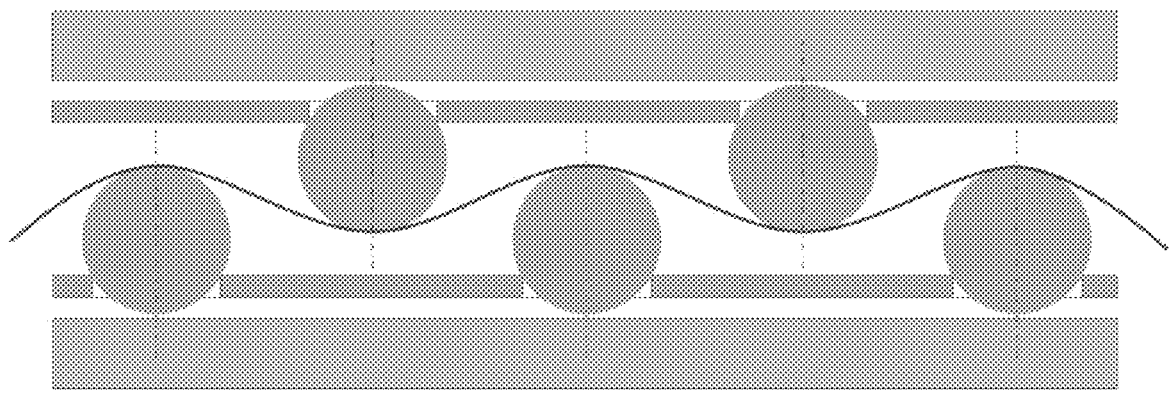
FIG. 12 schematically illustrates in 2-D the first and second reforming structures of FIG. 11 in a compressed mode wherein the preform sheet has been reformed to have corrugations characterized by peaks and valleys, or ridges and grooves.

FIG. 12 schematically illustrates in 2-D the first and second reforming structures of FIG. 11 in a compressed mode wherein the preform sheet has been reformed to have corrugations characterized by peaks and valleys, or ridges and grooves. The preform sheet shown in FIG. 11 is before the reforming, and FIG. 12 during or after reforming. The first and second, or top and bottom molds, in between glass ceramic masters, provide part of the pressing load.

Preferably, the diameter of balls is small compared to the mean local radius of curvature of the corrugated glass sheet, in order to minimize local surface degradation.

Figure 13:
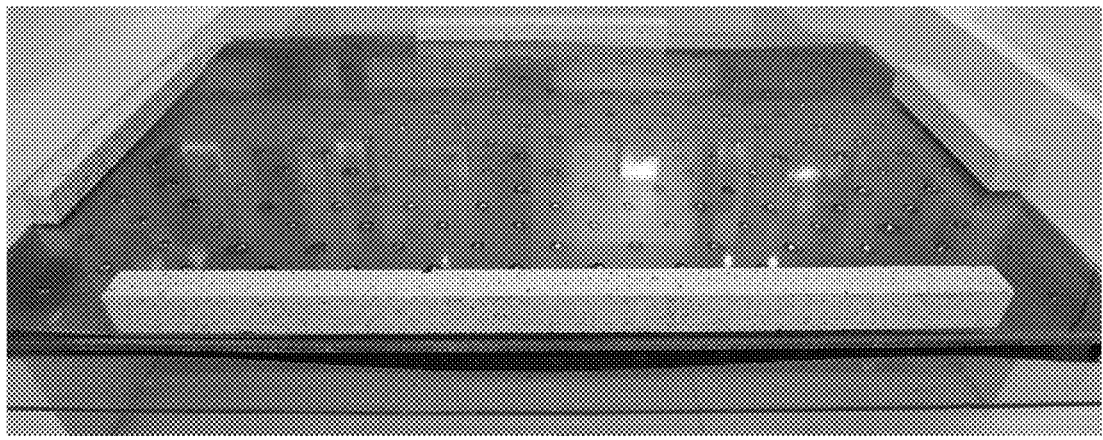
FIG. 13 shows a picture of a glass sheet disposed between top and bottom mold and glass ceramic masters.
Figure 14:
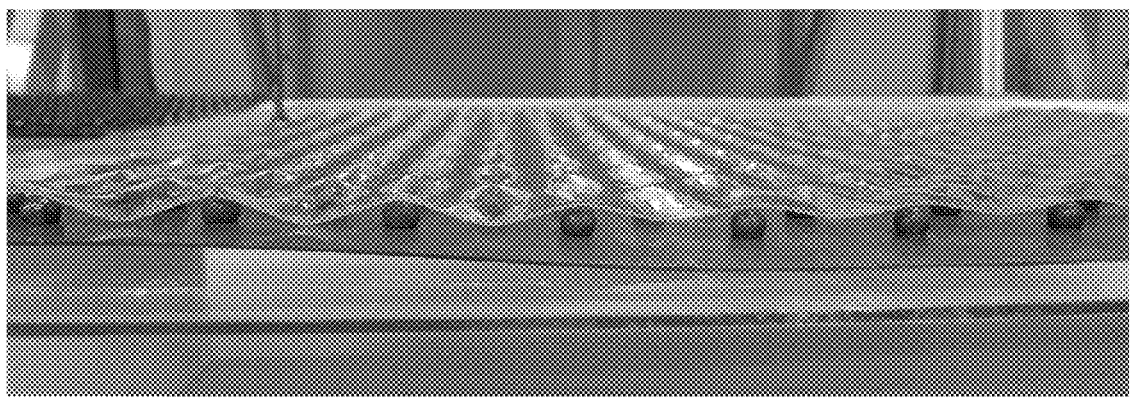
FIG. 14 shows a picture of the embodiment of FIG. 23 wherein the glass sheet is disposed on the bottom mold.

FIG. 13 shows a picture of an embodiment wherein a glass sheet is disposed between top and bottom mold and glass ceramic masters. In some embodiments, as shown in FIG. 13, the preform sheet is flat prior to reforming. FIG. 14 shows a picture of the embodiment of FIG. 13 wherein the glass sheet is disposed on the bottom mold after at least some reforming has taken place.

In one set of embodiments, a glass preform sheet is placed in between two molds, a mass is put on the upper mold, and the assembly goes through a thermal cycle presenting three phases: (1) a heating ramp from 20° C. to a reforming temperature that causes the glass to have a viscosity suitable for reforming, such as in a viscosity range of 10E 8 ($10^8$) to 10E 9 ($10^9$) or 10E9.5 ($10^{9.5}$) poises (for example: 5° per minute, up to 720° C.); (2) a plateau at the reforming temperature, wherein at least part of the glass has a viscosity suitable for reforming, such as in a viscosity range of 10E 8 to 10E 9 poises (for example: 20 minutes dwell at 720° C. or 2 minutes at 745° C.); and (3) a cooling ramp from the reforming temperature to room temperature (for example: 720° C. to room temperature at 5°/minute).

Figure 15:
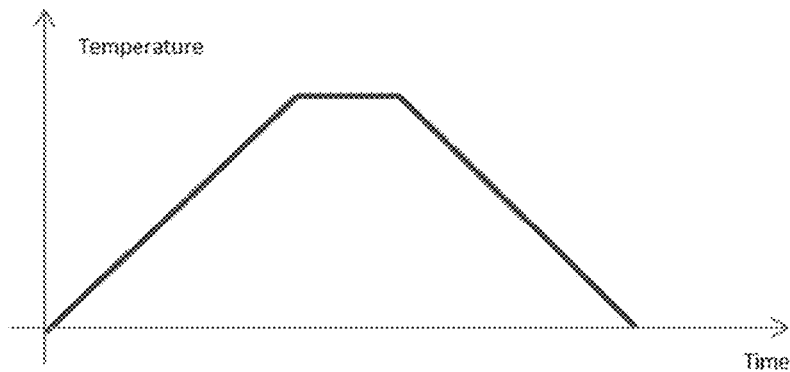
FIG. 15 schematically illustrates a three-phase thermal cycle suitable for reforming, particularly for glass.

FIG. 15 schematically illustrates one such three-phase thermal cycle. After cooling, the reformed (glass) sheet is removed from molds. Cooling, or further cooling, or part of the cooling, may occur after removal from the molds.

Advantageously, the reforming temperature is selected to obtain a balance between the duration of the cycle and the desired or preferred glass viscosity at which the reforming occurs. In one set of embodiments, the preform sheet is made of glass, and the glass viscosity domain is between $10^8$ and $10^{9.5}$ poise during reforming. In one set of embodiments, the e.g. preform sheet is made of Corning code 2317 glass available from Corning Incorporated, and the corresponding reforming temperature range is 720° to 740° C.

The reforming cycle can be performed in a static oven or in a dynamic lehr, such as where a plurality of such assemblies can undergo successive thermal environments following this cycle.

Figure 16:
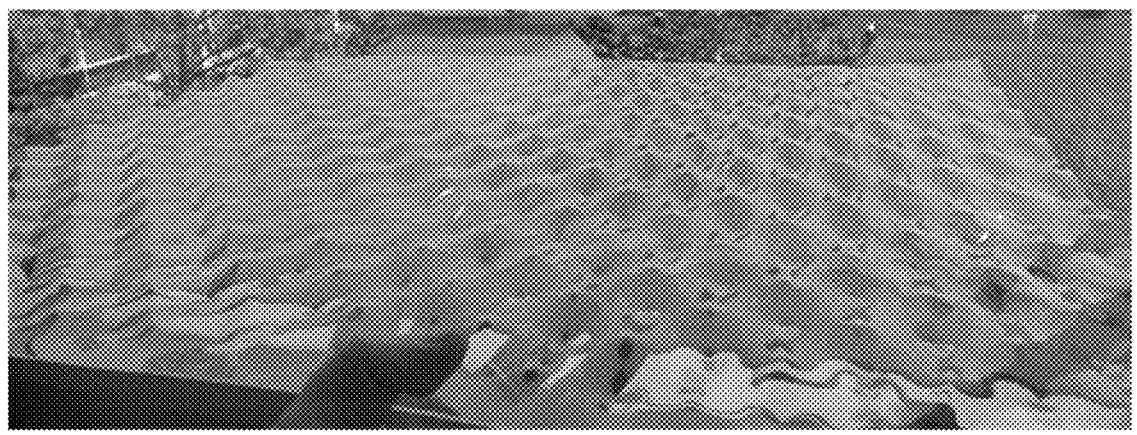
FIG. 16 shows a picture of the obtained corrugated 3D (glass) sheet as disclosed herein.

FIG. 16 shows a picture of the obtained corrugated 3D (glass) sheet as disclosed herein. The 3D sheet generally can lie in a flat plane (planar sheet), or can lie in a curvilinear plane, and the sheet has a plurality of peaks and valleys, wherein a cross-sectional profile in one direction along the sheet contains a first plurality of peaks, and a cross-sectional profile along the sheet in a perpendicular direction to that direction contains a second plurality of peaks. Optionally, the first plurality of peaks and the second plurality of peaks can include a peak or valley in common. Thus in FIG. 16, the 3D sheet comprises a first plurality of peaks in an x-direction and a second plurality of peaks in a y-direction which is perpendicular to the x-direction, wherein the first plurality of peaks is different from the second plurality of peaks.

In some embodiments of the 3-D corrugated sheet, the pitch between corrugation peaks (corresponding to the spacing between balls of the mold) is 30 to 70 mm; in some of these embodiments, the pitch (or spacing) is 40 to 60 mm; in some of these embodiments, the pitch (or spacing) is 45 to 55 mm; in some of these embodiments, the pitch (or spacing) is 50 to 55 mm; in some of these embodiments, the pitch (or spacing) is about 52 mm; in some of these embodiments, the peak to valley depth (or height of the 3-D structure, in the z-direction) is 5 to 30 mm; in some of these embodiments, the peak to valley depth (or height of the 3-D structure) is 10 to 25 mm; in some of these embodiments, the peak to valley depth (or height of the 3-D structure) is 10 to 20 mm; in some of these embodiments, the peak to valley depth (or height of the 3-D structure) is 12 to 17 mm; in some of these embodiments, the peak to valley depth (or height of the 3-D structure) is about 14 mm; in some of these embodiments, the thickness of the glass sheet is 0.5 mm to 3.0 mm; in some of these embodiments, the thickness of the glass sheet is 0.7 mm to 2.0 mm; in some of these embodiments, the height/thickness ratio (i.e. the ratio of the peak to valley depth divided by the glass thickness, or thickness of the glass) is greater than 1.5, in some embodiments greater than 2.0, in some embodiments greater than 5.0, in some embodiments greater than 10, in some embodiments greater than 15, in some embodiments greater than 20, in some embodiments greater than 25, in some embodiments greater than 30, in some embodiments greater than 35, in some embodiments greater than 40, in some embodiments greater than 45, in some embodiments greater than 50, in some embodiments greater than 55, and in some embodiments greater than 60; in some of these embodiments, a cross-sectional profile taken along a vertical plane (i.e. x-z or y-z plane perpendicular to an x-y plane, wherein the corrugated sheet can generally lie parallel to, or be coincident with, a horizontal x-y plane) that intersects two or more adjacent peaks (or valleys) (in a z-direction which is perpendicular to an x-y plane) has a sinusoidal, or generally sinusoidal, shape; in some embodiments, the corrugated sheet generally lies parallel to a horizontal x-y plane, and in both an x-z plane and in a y-z plane in which the x-z plane is perpendicular to the y-z plane, and in which both the x-z plane and the y-z plane are perpendicular to the x-y plane, the x-z plane intersects two or more adjacent peaks (or valleys) and the y-z plane intersects two or more adjacent peaks (or valleys), the sheet has respective sinusoidal, or generally sinusoidal, shapes n both the y-z and x-z planes; in some of these embodiments, any cross-sectional profiles of the corrugated sheet has a non-zero slope everywhere except at the maximum of respective peaks and the minimum of respective valleys.

In some embodiments, a non-stick agent compatible with the high temperature thermal cycle is utilized between the mold and the preform sheet, such as boron nitride, carbon soot and calcium hydroxide, which can improve the surface quality at contact points of the pressing members.

Figure 17:
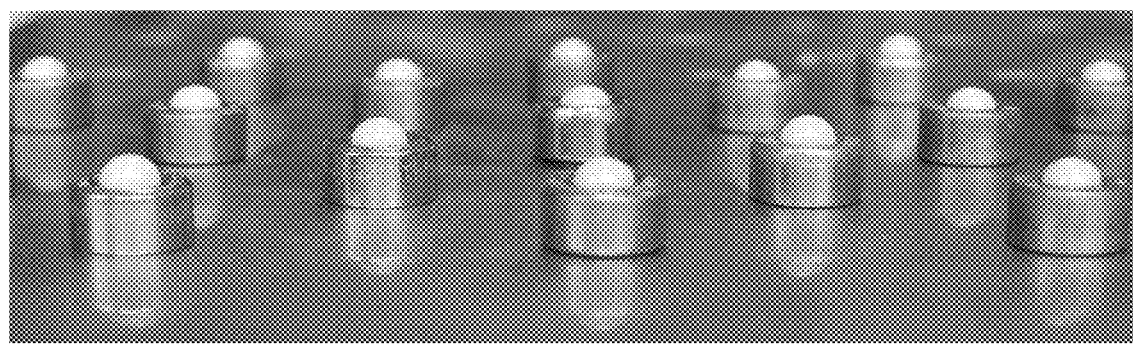
FIG. 17 shows a picture of an embodiment comprising a metal sheet with a plurality of supports with zirconium oxide balls disposed in the supports and protruding at least partially therefrom.

In some embodiments, pressing members comprising zirconium-containing balls can provide little to no surface degradation during the thermal cycle and provide excellent slipping behaviors with glass. FIG. 17 shows a picture of an embodiment comprising a metal sheet with a plurality of supports with zirconium oxide balls disposed in the supports and protruding at least partially therefrom. The supports can be made of metal.

In some embodiments, the use of local air bearing nozzles can prevent all contact with the preform, or glass sheet. The air bearing can be operated through porous materials such as graphite, mullite or silicon carbide.

Figure 18:
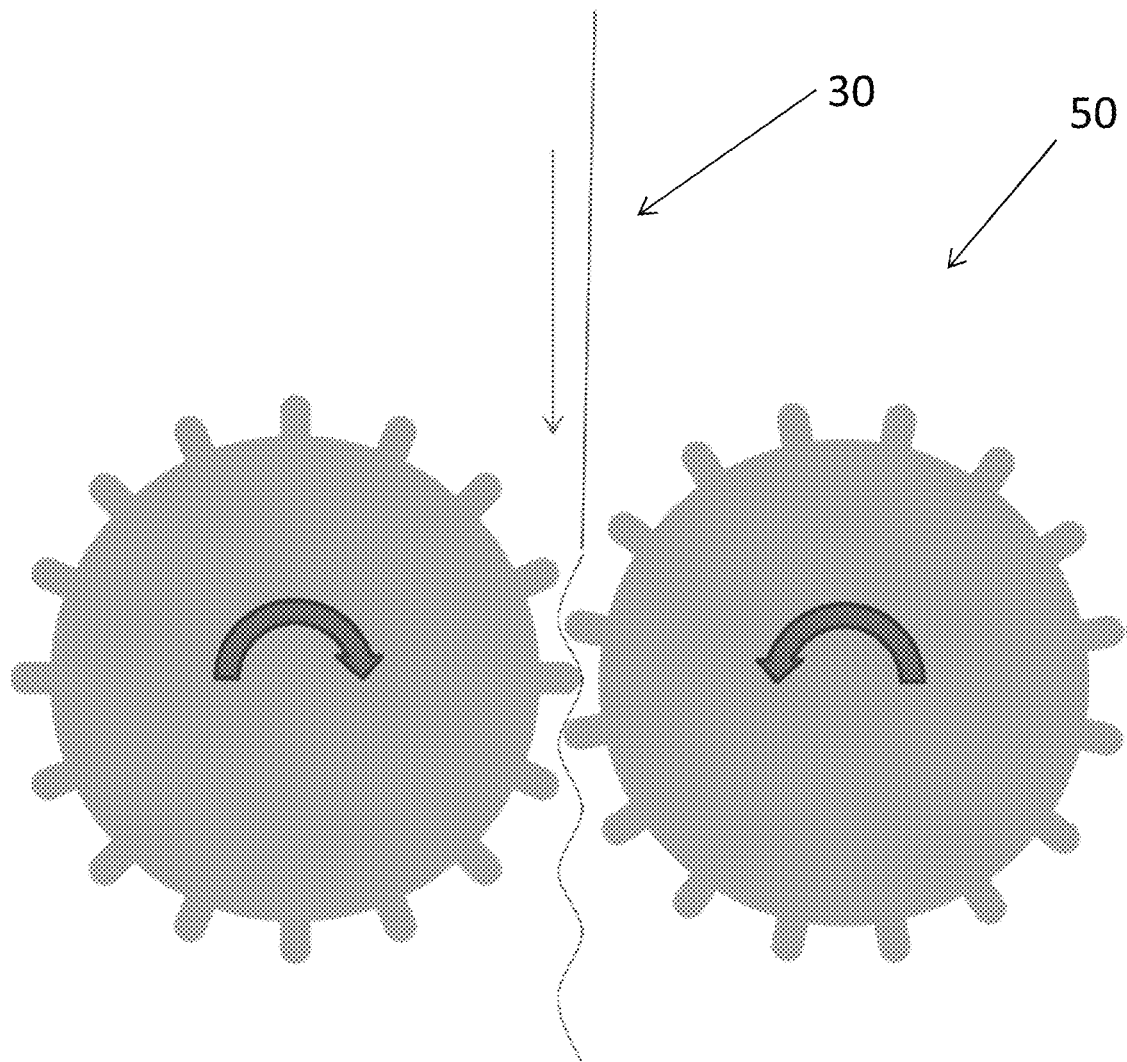
FIG. 18 schematically illustrates another embodiment disclosed herein of a reforming apparatus comprising reforming structures having pushing members, wherein the reforming is performed vertically, on reheated sheet or sheets or ribbons or ribbon, or in line with the production of the glass sheet.

In another set of embodiments disclosed herein, the reforming is performed vertically, on reheated sheets or ribbons, or in line with the production of the glass sheet as depicted in FIG. 18.

FIG. 18 schematically illustrates first and second reforming structures in opposing arrangement, shown in vertical orientation, with a preform sheet sandwiched, or disposed, therebetween, wherein the first and second reforming structures are two opposing rollers, or roller pressing members, wherein each of the reforming structures are depicted as comprising pushing means, such as each reforming structure having a plurality of pushing members. The pushing members of the of the first reforming structure (or first roller) are spatially offset from the pushing members of the second reforming structure (or second roller).

The large amplitude 3D corrugated thin sheets disclosed herein can comprise glass, glass ceramic, polymer, or combinations thereof.

Other 3D shapes can be obtained by changing the pushing means arrangement. A different mold pattern will deliver another embodiment of a reformed sheet with hills and valleys. For example, the corrugated sheet (or panel) can comprise a periodic pattern, a semi-periodic pattern, a non-periodic sinusoidal pattern, two imbricated periods pattern, or a combination thereof. One or both surfaces of the panel can be produced to be pristine, or substantially pristine (e.g. except for contact areas with pushing members). In some embodiments, one or both surfaces of the sheet are polished, or di-polished, e.g. by sand blasting, prior to or after reforming. In some embodiments, one or both surfaces (or sides) of the sheet are painted; in some of these embodiments, only one side of the sheet is painted (e.g. black, white, grey, or multilayers of dichroic colors are applied, e.g.

after reforming; in such embodiments, one side of the sheet can be colored while the other is uncolored, which in some cases is easier to clean. In some embodiments, a mirror treatment, e.g. a deposition of silver, copper, gold, or electroless metal can be applied to a surface of the sheet, e.g. after reforming.

Further, while specific reference has been made herein to the use of flat preform sheets, the reformed sheet can be further shaped to have a generally non-flat overall curvature. The reformed sheet, or panel, can be post-shaped into having a cylindrical, conical, locally bent, or any combination thereof, shape, either locally or over the entire sheet (panel), i.e. the general envelope shape; such shaping can be carried out by heating the sheet to a second, higher viscosity (i.e. a lower post forming temperature that is lower than the reforming temperature) that would not affect, or not substantially affect, the corrugations that were produced by the reforming process.

Also, non-uniform pushing means can be used to achieve non-uniform elevation patterns.

Disclosed herein are non-planar, large amplitude 3D corrugated sheets, wherein the amplitude of the 3D shape is large in comparison with the sheet thickness, for example ranging from 5 to 20, or greater. The overall profile can be a 3D non-developable shape. Such non-planar, large amplitude 3D corrugated sheets can be manufactured by reforming via local pushing means that affect the surface quality only on a very limited part of the surface, leaving the remaining large portion of the sheet in untouched, or pristine, condition. The apparatus and method disclosed herein provide a way to create geometrically controlled repeatable 3D large amplitude sheets with corrugations (corrugated sheets), and in some embodiments while maintaining optical properties such as transparency. Such apparatus and method can thus avoid the extensive mold or roller contact of known methods of producing smaller amplitude corrugations, and can thus avoid material (such as glass) sticking to the mold by virtue of the relatively small contact areas of the pressing members of the present disclosure. With the present disclosure, the sheet is not limited to corrugation peaks or valleys, or peak to valley heights, which are smaller or close to a fraction of the sheet thickness. Also, the methods and apparatus disclosed herein can avoid the surface quality being largely affected or degraded by a reforming tool action on the material.

In a set of embodiments, a 3-D corrugated sheet is disclosed herein having a thickness, a plurality of peaks and valleys, and a peak to valley depth, wherein a height/thickness ratio, which is a peak to valley depth divided by the thickness, is greater than 1.5, in some embodiments greater than 2.0, in some embodiments greater than 5.0, in some embodiments greater than 10, in some embodiments greater than 15, in some embodiments greater than 20, in some embodiments greater than 25, in some embodiments greater than 30, in some embodiments greater than 35, in some embodiments greater than 40, in some embodiments greater than 45, in some embodiments greater than 50, in some embodiments greater than 55, in some embodiments greater than 60; in some of these embodiments, a pitch between corrugation peaks is 30 to 70 mm, in some embodiments 40 to 60 mm, in some embodiments 45 to 55 mm, in some embodiments 50 to 55 mm; in some of these embodiments, the peak to valley depth is 5 to 30 mm, in some embodiments 10 to 25 mm, in some embodiments 10 to 20 mm, in some embodiments 12 to 17 mm; in some of these embodiments, the thickness of the sheet is 0.5 mm to 3.0 mm, in some embodiments 0.7 mm to 2.0 mm; in some of these embodiments, the sheet has a sinusoidal or generally sinusoidal shape; in some of these embodiments the sheet is comprised of glass, glass ceramic, polymer, or a combination thereof.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass or glass-ceramic sheet, comprising:
    peaks and valleys,
    wherein a cross-sectional profile in one direction along the sheet contains a first plurality of peaks, and a cross-sectional profile along the sheet in a perpendicular direction to that direction contains a second plurality of peaks, wherein the first plurality of peaks is different from the second plurality of peaks;
    wherein the peaks and valleys have large amplitude such that peak-to-valley depth is in the range of 5 to 30 mm;
    wherein pitch between peaks of the first or second plurality is in the range of 30 to 70 mm; and
    wherein the sheet is thin, having a thickness in the range of 0.5 mm to 3 mm.

2. The glass or glass-ceramic sheet of claim 1, wherein a cross-sectional profile of the sheet has a non-zero slope except at the maximum of respective peaks and the minimum of respective valleys.

3. The glass or glass-ceramic sheet of claim 1, wherein the plurality of peaks and valleys are in a periodic pattern.

4. The glass or glass-ceramic sheet of claim 1, wherein the sheet has transparency.

5. The glass or glass-ceramic sheet of claim 1, a cross-sectional profile taken along a plane that intersects two or more adjacent peaks has a sinusoidal shape.

6. The glass or glass-ceramic sheet of claim 1, wherein a ratio of the peak-to-valley depth divided by the thickness of the sheet is greater than 1.5.

7. A glass or glass-ceramic sheet, comprising:
    peaks and valleys,
    wherein a cross-sectional profile in one direction along the sheet contains a first plurality of peaks, and a cross-sectional profile along the sheet in a perpendicular direction to that direction contains a second plurality of peaks, wherein the first plurality of peaks is different from the second plurality of peaks;
    wherein a cross-sectional profile of the sheet has a non-zero slope except at the maximum of respective peaks and the minimum of respective valleys; and
    wherein a ratio of peak-to-valley depth divided by thickness of the sheet is greater than 1.5.

8. The glass or glass-ceramic sheet of claim 7, wherein the peaks and valleys have large amplitude such that peak-to-valley depth is in the range of 5 to 30 mm.

9. The glass or glass-ceramic sheet of claim 7, wherein pitch between peaks of the first or second plurality is in the range of 30 to 70 mm.

10. The glass or glass-ceramic sheet of claim 7, wherein the sheet is thin, having a thickness in the range of 0.5 mm to 3 mm.

11. The glass or glass-ceramic sheet of claim 7, wherein the plurality of peaks and valleys are in a periodic pattern.

12. The glass or glass-ceramic sheet of claim 7, wherein the sheet has transparency.

13. The glass or glass-ceramic sheet of claim 7, a cross-sectional profile taken along a plane that intersects two or more adjacent peaks has a sinusoidal shape.

\* \* \* \* \*